United States Patent
Iyengar et al.

(10) Patent No.: US 10,424,821 B2
(45) Date of Patent: Sep. 24, 2019

(54) THERMALLY REGULATED MODULAR ENERGY STORAGE DEVICE AND METHODS

(71) Applicant: Yotta Solar, Inc., Austin, TX (US)

(72) Inventors: Vikram N. Iyengar, Austin, TX (US); Omeed Badkoobeh, Austin, TX (US)

(73) Assignee: YOTTA SOLAR, INC., Austin, TX (US)

( * ) Notice: Subject to any disclaimer, the term of this patent is extended or adjusted under 35 U.S.C. 154(b) by 0 days.

(21) Appl. No.: 15/944,355

(22) Filed: Apr. 3, 2018

(65) Prior Publication Data

US 2018/0287231 A1    Oct. 4, 2018

Related U.S. Application Data

(60) Provisional application No. 62/480,855, filed on Apr. 3, 2017.

(51) Int. Cl.
| | |
|---|---|
| *H01M 10/659* | (2014.01) |
| *H01M 10/6552* | (2014.01) |
| *F28D 20/02* | (2006.01) |
| *H01M 10/6551* | (2014.01) |

(Continued)

(52) U.S. Cl.
CPC ...... *H01M 10/659* (2015.04); *F28D 15/0275* (2013.01); *F28D 20/021* (2013.01); *F28D 20/028* (2013.01); *H01M 2/1094* (2013.01); *H01M 10/6551* (2015.04); *H01M 10/6552* (2015.04); *Y02E 10/44* (2013.01); *Y02E 60/145* (2013.01); *Y02E 70/30* (2013.01); *Y02T 10/7005* (2013.01)

(58) Field of Classification Search
CPC ............. H01M 10/60; H01M 10/6552; H01M 10/659; H01M 2/1094; F28D 15/0275; F28D 20/021; F28D 20/028
See application file for complete search history.

(56) References Cited

U.S. PATENT DOCUMENTS

| | | | | |
|---|---|---|---|---|
| 4,329,407 A | * | 5/1982 | Gross | F28D 15/0275 429/101 |
| 4,673,080 A | | 6/1987 | Bartylla | |
| 5,269,146 A | | 12/1993 | Kerner | |

(Continued)

FOREIGN PATENT DOCUMENTS

WO    2016064138 A1    4/2016

OTHER PUBLICATIONS

PCT/US18/25866, Search Report and Written Opinion, dated Jun. 29, 2018, 11 pages.

*Primary Examiner* — James Lee
(74) *Attorney, Agent, or Firm* — Cesari & Reed LLP; R. Michael Reed

(57) ABSTRACT

In some embodiments, a device may include one or more thermal insulation panels defining an enclosure and a phase change material (PCM) within the enclosure. The device may further include at least one unidirectional heat pipe including a proximal portion extending into the enclosure, a distal portion extending outside of the enclosure, and an intermediate portion between the proximal portion and the distal portion. In one aspect, the device may also include a heat sink including a plurality of heat fins configured to dissipate heat, the heat sink coupled to the distal end of the at least one unidirectional heat pipe.

22 Claims, 9 Drawing Sheets

(51) Int. Cl.
*F28D 15/02* (2006.01)
*H01M 2/10* (2006.01)

(56) References Cited

U.S. PATENT DOCUMENTS

| | | |
|---|---|---|
| 5,338,624 A | 8/1994 | Gruenstem et al. |
| 5,449,571 A | 9/1995 | Longardner et al. |
| 5,548,201 A | 8/1996 | Grabon |
| 5,687,706 A | 11/1997 | Goswami et al. |
| 5,717,313 A | 2/1998 | Grabon |
| 5,912,547 A | 6/1999 | Grabon |
| 6,192,703 B1 * | 2/2001 | Salyer .................. C09K 5/066 62/457.7 |
| 6,220,337 B1 | 4/2001 | Chen et al. |
| 6,464,027 B1 | 10/2002 | Dage et al. |
| 6,468,689 B1 | 10/2002 | Al-Hallaj et al. |
| 6,570,362 B1 | 5/2003 | Estes et al. |
| 6,596,433 B2 | 7/2003 | Gudmundsson et al. |
| 6,784,356 B1 | 8/2004 | Czarnecki et al. |
| 6,891,353 B2 | 5/2005 | Tsukamoto et al. |
| 6,942,944 B2 | 9/2005 | Al-Hallaj |
| 7,270,910 B2 | 9/2007 | Yahnker et al. |
| 7,443,136 B2 | 10/2008 | Tsukamoto et al. |
| 7,510,797 B2 | 3/2009 | Aker et al. |
| 7,592,776 B2 | 9/2009 | Tsukamoto et al. |
| 7,931,979 B2 | 4/2011 | Choi et al. |
| 7,967,256 B2 | 6/2011 | Wong |
| 8,218,321 B2 | 7/2012 | Foxenland |
| 8,263,250 B2 | 9/2012 | Hermann |
| 8,268,469 B2 | 9/2012 | Hermann |
| 8,273,474 B2 | 9/2012 | Al-Hallaj et al. |
| 8,343,647 B2 | 1/2013 | Ahn et al. |
| 8,410,760 B2 | 4/2013 | Formanski et al. |
| 8,415,041 B2 | 4/2013 | Eisenhour |
| 8,484,496 B2 | 7/2013 | Anderson et al. |
| 8,518,574 B1 | 8/2013 | Kwak et al. |
| 8,541,127 B2 | 9/2013 | Tennessen et al. |
| 8,557,415 B2 | 10/2013 | Mardall et al. |
| 8,574,734 B2 | 11/2013 | Eisenhour |
| 8,620,506 B2 | 12/2013 | Kummer et al. |
| 8,623,538 B2 | 1/2014 | Wang |
| 8,658,299 B2 | 2/2014 | Yang et al. |
| 8,679,659 B2 | 3/2014 | Claypole et al. |
| 8,758,924 B2 | 6/2014 | Tennessen et al. |
| 8,758,925 B2 | 6/2014 | Choi et al. |
| 8,778,519 B1 | 7/2014 | Frey et al. |
| 8,835,035 B2 | 9/2014 | Kim |
| 8,927,131 B2 | 1/2015 | Wang |
| 8,932,743 B2 | 1/2015 | Simonini et al. |
| 8,936,864 B2 | 1/2015 | Yang et al. |
| 9,016,070 B2 | 4/2015 | Boarman |
| 9,070,958 B2 | 6/2015 | Obasih et al. |
| 9,099,762 B2 | 8/2015 | Yang et al. |
| 9,105,951 B2 | 8/2015 | Anderson-Straley et al. |
| 9,196,939 B2 | 11/2015 | Christian et al. |
| 9,252,466 B2 | 2/2016 | Norton |
| 9,350,057 B2 | 5/2016 | Yang |
| 9,379,419 B2 | 6/2016 | Krolak |
| 9,397,375 B2 | 7/2016 | Biskup et al. |
| 9,397,376 B2 | 7/2016 | Rawlinson et al. |
| 9,401,500 B2 | 7/2016 | Kwak et al. |
| 9,419,311 B2 | 8/2016 | Bertness |
| 9,461,491 B2 | 10/2016 | Winkler |
| 9,490,507 B2 | 11/2016 | Bandhauer et al. |
| 9,490,508 B2 | 11/2016 | Heise |
| 9,496,588 B2 | 11/2016 | Nguyen et al. |
| 9,496,589 B2 | 11/2016 | Kopra et al. |
| 9,528,730 B2 | 12/2016 | Boarman |
| 9,553,346 B2 | 1/2017 | Hermann |
| 9,586,497 B2 | 3/2017 | Epstein et al. |
| 9,614,263 B2 | 4/2017 | Yang et al. |
| 9,620,827 B2 | 4/2017 | Houchin-Miller et al. |
| 9,704,384 B2 | 7/2017 | Bandhauer et al. |
| 9,731,621 B2 | 8/2017 | Rawlinson |
| 9,742,047 B2 | 8/2017 | Ebner et al. |
| 9,758,012 B2 | 9/2017 | Johnston |
| 9,780,418 B2 | 10/2017 | Obasih et al. |
| 9,793,585 B2 | 10/2017 | Obasih et al. |
| 2006/0174720 A1 * | 8/2006 | Renken .................. G01D 9/005 73/866.1 |
| 2008/0311468 A1 | 12/2008 | Hermann |
| 2009/0004556 A1 | 1/2009 | Al-Hallaj et al. |
| 2009/0071178 A1 | 3/2009 | Major et al. |
| 2009/0169983 A1 | 7/2009 | Kumar et al. |
| 2010/0028758 A1 | 2/2010 | Eaves et al. |
| 2010/0108291 A1 | 5/2010 | Onnerud et al. |
| 2010/0027304 A1 | 10/2010 | Lawall et al. |
| 2011/0081564 A1 | 4/2011 | Choi et al. |
| 2011/0159341 A1 * | 6/2011 | Iwamoto .............. H01M 2/1094 429/120 |
| 2011/0206969 A1 | 8/2011 | Tennessen et al. |
| 2011/0244294 A1 | 10/2011 | Han et al. |
| 2011/0255044 A1 | 10/2011 | Foxenland |
| 2012/0003515 A1 * | 1/2012 | Eisenhour .............. H01M 10/625 429/62 |
| 2012/0003523 A1 | 1/2012 | Schaller et al. |
| 2012/0029724 A1 | 2/2012 | Formanski et al. |
| 2012/0135281 A1 | 5/2012 | Choi et al. |
| 2012/0171523 A1 | 7/2012 | Yang et al. |
| 2012/0192574 A1 | 8/2012 | Ghoshal et al. |
| 2012/0227926 A1 * | 9/2012 | Field .................... F24D 11/003 165/10 |
| 2012/0235640 A1 | 9/2012 | Bridges |
| 2012/0258337 A1 | 10/2012 | Wang |
| 2012/0325826 A1 | 12/2012 | McCormick |
| 2012/0327596 A1 | 12/2012 | Anderson-Straley et al. |
| 2013/0004806 A1 | 1/2013 | Wang |
| 2013/0022853 A1 | 1/2013 | Protheroe |
| 2013/0108897 A1 | 5/2013 | Christian et al. |
| 2013/0202939 A1 | 8/2013 | Kwak et al. |
| 2013/0236745 A1 | 9/2013 | Norton |
| 2013/0270476 A1 | 10/2013 | Shuang et al. |
| 2014/0004394 A1 | 1/2014 | Kerkamm |
| 2014/0012447 A1 | 1/2014 | Gao et al. |
| 2014/0017118 A1 | 1/2014 | Stoddard et al. |
| 2014/0075963 A1 | 3/2014 | Boarman |
| 2014/0102662 A1 | 4/2014 | Grama et al. |
| 2014/0165597 A1 | 6/2014 | Hernon et al. |
| 2014/0227568 A1 | 8/2014 | Hermann |
| 2014/0326430 A1 | 11/2014 | Carpenter et al. |
| 2014/0335382 A1 | 11/2014 | Balandin |
| 2014/0338376 A1 | 11/2014 | Carpenter et al. |
| 2014/0370354 A1 | 12/2014 | Yang et al. |
| 2015/0017422 A1 | 1/2015 | Lee |
| 2015/0054460 A1 | 2/2015 | Epstein et al. |
| 2015/0086832 A1 | 3/2015 | Yang |
| 2015/0198359 A1 | 7/2015 | Boarman |
| 2016/0006282 A1 | 1/2016 | Winkler |
| 2016/0043453 A1 | 2/2016 | Ebner et al. |
| 2016/0064783 A1 | 3/2016 | Chorian et al. |
| 2016/0104925 A1 | 4/2016 | Xiang |
| 2016/0181835 A1 | 6/2016 | Gross et al. |
| 2016/0195340 A1 | 7/2016 | Bissell et al. |
| 2016/0257180 A1 | 9/2016 | Zhou et al. |
| 2016/0264018 A1 | 9/2016 | Choufany et al. |
| 2017/0033411 A1 | 2/2017 | Pais et al. |
| 2017/0102177 A1 | 4/2017 | Boarman |
| 2017/0125866 A1 | 5/2017 | Zhou et al. |
| 2017/0210196 A1 | 7/2017 | Bidner et al. |
| 2017/0225586 A1 | 8/2017 | Zhang et al. |
| 2017/0229747 A1 | 8/2017 | Jung et al. |
| 2017/0229748 A1 | 8/2017 | Rawlinson et al. |
| 2017/0256828 A1 | 9/2017 | Li et al. |
| 2017/0256830 A1 | 9/2017 | Qiu et al. |
| 2017/0263954 A1 | 9/2017 | Shikh et al. |
| 2017/0297431 A1 | 10/2017 | Epstein et al. |

\* cited by examiner

THERMALLY REGULATED MODULAR ENERGY STORAGE DEVICE AND METHODS

CROSS-REFERENCE TO RELATED APPLICATION(S)

This application is a non-provisional of and claims priority to U.S. Provisional Patent Application No. 62/480,855 filed on Apr. 3, 2017 and entitled "Thermal-Regulated Modular Energy Storage Device," which is incorporated herein by reference in its entirety.

FIELD

The present disclosure is generally related to energy storage devices, such as batteries, and more particularly to energy storage devices with integrated thermal regulation.

BACKGROUND

Batteries and other energy storage devices are often used for storing energy for future use. In the context of renewable energy, such as solar or wind energy, it is common to use energy storage devices, such as batteries, to store the energy until it is ready for transmission or ready for use. Conventional energy storage device installations may have associated problems including complexity, heating, location and size constraints, other problems, or any combination thereof.

Often, conventional energy storage devices may operate well indoors and in controlled temperature environments, but may suffer degraded performance, reduced lifespan, unsatisfactory performance, and elevated risk levels if installed in hot (or cold) environments, such as proximate to a roof-mounted solar panel. Further, indoor installations that attempt to minimize the distance between energy generation and energy storage may consume valuable interior real estate. In particular, energy storage devices may occupy a large area within a structure, reducing the amount of space available for other uses.

SUMMARY

In some embodiments, a thermally regulated modular energy storage device may include a plurality of energy storage components (such as batteries) and an integrated temperature regulation system. The integrated temperature regulation system may include a housing configured to buffer the heat, a phase change material configured to change phase in response to temperature changes in order to dissipate heat, and a plurality of thermal structures to selectively dissipate heat or to protect against sub-freezing temperatures. The plurality of thermal structures may include passive cooling structures, active cooling structures, insulating panels or housings, reflective coatings, active heating structures, or any combination thereof.

In some embodiments, a device may include one or more thermal insulation panels defining an enclosure and a phase change material (PCM) within the enclosure. The device may further include at least one unidirectional heat pipe including a proximal portion extending into the enclosure, a distal portion extending outside of the enclosure, and an intermediate portion between the proximal end and the distal end. In a particular embodiment, the distal portion may be elevated relative to the proximal portion. In one aspect, the device may also include a heat sink including a plurality of heat fins configured to dissipate heat, where the heat sink is coupled to the distal end of the at least one unidirectional heat pipe. In at least one aspect, the unidirectional heat pipe may operate when an ambient temperature exceeds a temperature threshold and may remain inactive when the ambient temperature is below the temperature threshold.

In other embodiments, a device may include an electrical component and a phase change material (PCM) disposed around the electrical component. The PCM may be configured to melt over a pre-determined temperature range. The device may also include a plurality of vacuum insulated panels positioned to define an enclosure sized to receive the PCM and the electrical component. The plurality of vacuum insulated panels may be configured to provide thermal insulation, fire resistance, and physical structure. In at least one aspect, the device may further include a unidirectional heat pipe including a proximal end extending into the enclosure, a distal end, and an intermediate portion between the proximal end and the distal end.

In still other embodiments, a device can include a housing defining an enclosure, a plurality of vacuum insulated panels arranged around an interior periphery of the enclosure, an electrical component within the enclosure, and a phase change material (PCM) within the enclosure and around the electrical component. The device may further include a unidirectional heat pipe including a proximal end extending into the enclosure, a distal end extending away from the enclosure, and an intermediate portion including a physical feature to provide a thermal rectifier function.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1A:
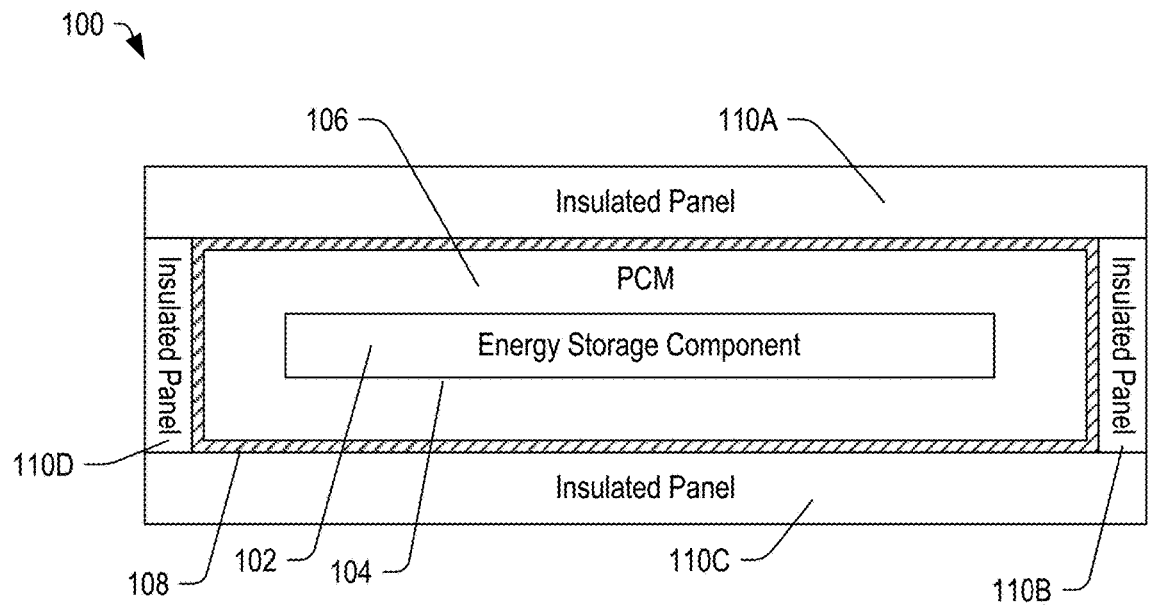
FIG. 1A depicts a block diagram of an energy storage device with integrated thermal regulation, in accordance with certain embodiments of the present disclosure.

The following description is of illustrative embodiments only, and is not intended to limit the scope, applicability or configuration of the disclosure. Rather, the following description is intended to provide a convenient illustration for implementing various embodiments. Various changes may be made in the component elements, their functions, their arrangement, or any combination thereof in the embodiments without departing from the scope of the disclosure. It should be appreciated that the description herein may be adapted to be employed with different devices having different shapes, components, energy production mechanisms and the like, and may still fall within the scope of the present disclosure. Thus, the detailed description herein is presented for purposes of illustration only and not of limitation.

Embodiments of an electronic device are described below that include a thermal regulation assembly that may be configured to regulate and dissipate heat generated by one or more electronic components while also thermally insulating the electronic components from the ambient environment. The electronic components may include circuits, charge storage components (such as rechargeable batteries), or other electronic components that may generate heat during operation. Further, the device may be used in a variety of contexts including automobiles, solar installations, electronic devices, and so on.

In some embodiments, the device may include an insulative layer, such as one or more vacuum insulating panels (VIPs), which can provide thermal insulation from the ambient environment while also providing structure. The device may further include a phase change material (PCM) and a unidirectional heat pump configured to cooperate with the PCM to dissipate heat. The unidirectional heat pump may include one or more heat pipes that can be configured to operate to dissipate heat when the ambient temperature exceeds a threshold temperature and to remain inactive when the ambient temperature is below a threshold temperature.

In some embodiments, the PCM material may have a phase change threshold temperature that may be selected according to the environment in which the device may be used. The unidirectional heat pump may include tube or heat pipe having a proximal portion that extends into or is in contact with the PCM, a distal portion that extends outside of the insulative layer, and an intermediate portion that extends between the proximal and distal portions. In some embodiments, the tube or heat pipe may include a kinked or bent portion outside of the VIP, which kinked or bent portion may operate as a thermal rectifier, rendering the tube or heat pipe unidirectional with respect to fluid flow and heat dissipation. The kink or bend may be part of the intermediate portion of the heat pipe. In an example, a distal end of the tube or heat pipe may be coupled to one or more heat fins to dissipate heat. In some embodiments, the electronic component (such as a battery, a circuit, another component, or any combination thereof) may be positioned within the PCM. Other embodiments are also possible.

It should be appreciated that several different structural configurations of the device may be possible, including a device with a heat pipe, a device with an integrated heat sink, and so on. In the following discussion, the thermal management components may be configured to dissipate heat from a charge storage element, such as a battery or plurality of batteries, which may generate heat during recharging and during use. Further, it should be understood that the device may include one or more insulative panels configured to provide both insulation and structural support for the PCM and the electronic component. In sub-freezing temperature environments, the one or more insulative panels may cooperate to maintain the temperature of the PCM and the electronic component within an operating temperature range of the electronic component. In some embodiments, such as that described below with respect to FIG. 1, the insulative panels may be external to the packaging associated with the electronic component and external to a housing that is configured to secure the PCM material as well.

FIG. 1 depicts a block diagram of an energy storage device 100 with integrated thermal regulation, in accordance with certain embodiments of the present disclosure. The energy storage device 100 may include an energy storage component 102 including one or more charge storage elements (such as batteries). In the illustrated example, the energy storage component 102 may include a substantially rectangular package 104, which may provide both structural and electrical isolation for the charge storage component 102.

The energy storage device 100 may further include a phase change material (PCM) 106 in contact with the package 104 of the energy storage component 102. Further, the PCM 106 may be secured by a housing 108. A plurality of vacuum panels 110 may be arranged about the periphery of the housing 108 to insulate the housing 108 from the ambient environment. In the illustrated example, the vacuum panels 110 may include a first panel 110A, a second panel 110B, a third panel 110C, and a fourth panel 110D. Fifth and sixth panels are not shown, but should be understood as being included to surround all six sides of the rectangular prism shape. Other shapes and other embodiments are also possible.

It should be appreciated that the housing 108 defines an enclosure, which may include the phase change material (PCM) 106 and one or more energy storage components 102. The one or more storage components 102 may include batteries, accumulators, capacitive devices, other energy storage devices, or any combination thereof. Each of the energy storage components 102 can include an energy storage mechanism (such as chemicals, charge storage plates, etc.) and a packaging (such as a metallic coating or other material). For example, a standard lithium-ion battery may include a lithium-ion chemical charge storage material (energy storage mechanism) contained within a battery packaging. The battery packaging provides a physical structure (penetration proofing), a thermal interface, electrical isolation, and electrical interconnect terminals. In an alternative embodiment, an electronic component may be contained within the PCM 106 in addition to or in lieu of the energy storage component 102. Other embodiments are also possible.

In the illustrated embodiment, the housing 108 may be formed from a thermally insulative or thermally neutral material configured to provide structure for the device. The housing 108 may be configured to secure the PCM 106 and to allow heat to dissipate from the PCM 108. Further, the energy storage device 100 may permit dry contact between the energy storage components 102 and the PCM 106, and the housing 108 (or another structure) may secure the energy storage components 102 to maintain a consistent spacing and position. In some embodiments, in addition to the housing 108, the device 100 may also include compression plates (not shown) within the housing 108 that can be secured to one another to maintain a consistent spacing in at least one dimension, allowing the PCM 106 to flow in a controlled direction when heat from the one or more energy storage components 102 causes the PCM 106 to melt and flow.

In the illustrated example, the insulative panels 110 are external to the housing 108. The insulative panels 110 may be vacuum insulated panels, which may include a thin-film coating surrounding a core material, such as a porous ceramic structure or from another material capable of resisting thermal transfer. In some embodiments, the housing 108 may be formed from the vacuum insulated panels 100.

Figure 1B:
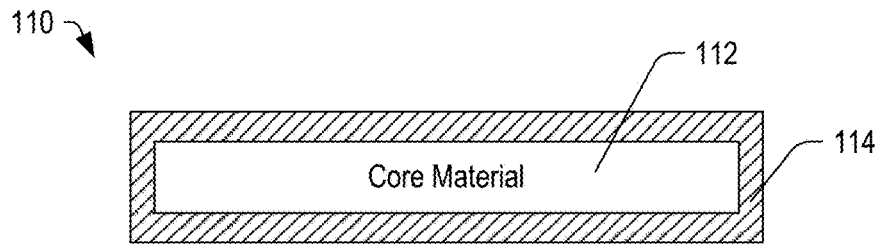
FIG. 1B depicts a block diagram of a vacuum insulated panel that can be used with the energy storage device of FIG. 1A, in accordance with certain embodiments of the present disclosure.

FIG. 1B depicts a block diagram of a vacuum-insulated panel (VIP) 110 that can be used with the energy storage device of FIG. 1A, in accordance with certain embodiments of the present disclosure. In the illustrated example, the VIP 110 may include a core material 112 surrounded by a thin film material 114, such as a metallic film. The core material 112 may be formed from a porous ceramic structure or from another material. Preferably, the thin film material 114 may be wrapped around the core material 112, and the sides and ends may be sealed while a vacuum is applied to produce the VIP 110.

Figure 1C:
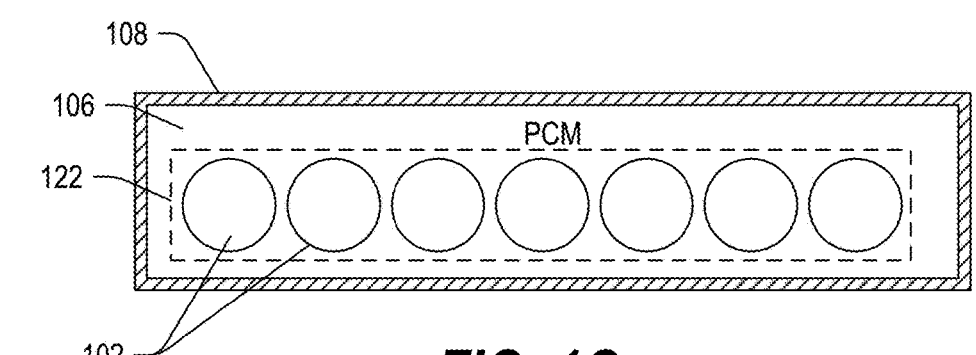
FIG. 1C depicts a block diagram of an energy storage device with integrated thermal regulation and including a charge storage component holder, in accordance with certain embodiments of the present disclosure.

FIG. 1C depicts a block diagram of an energy storage device 120 with integrated thermal regulation and including a charge storage component holder 122, in accordance with certain embodiments of the present disclosure. In this example, the charge storage component holder 122 may be configured to secure and maintain spacing for a plurality of charge storage components 102. In some examples, the charge storage component holder 122 may allow PCM 106 to flow into or through the holder 122 (at least when the PCM 106 reaches its melt temperature) to establish contact with the charge storage components 102. In some embodiments, the VIP 110 may be coupled to the exterior surface of the housing 108. In other embodiments, the housing 108 may be formed from one or more VIPs 110. Other embodiments are also possible.

Figure 2:
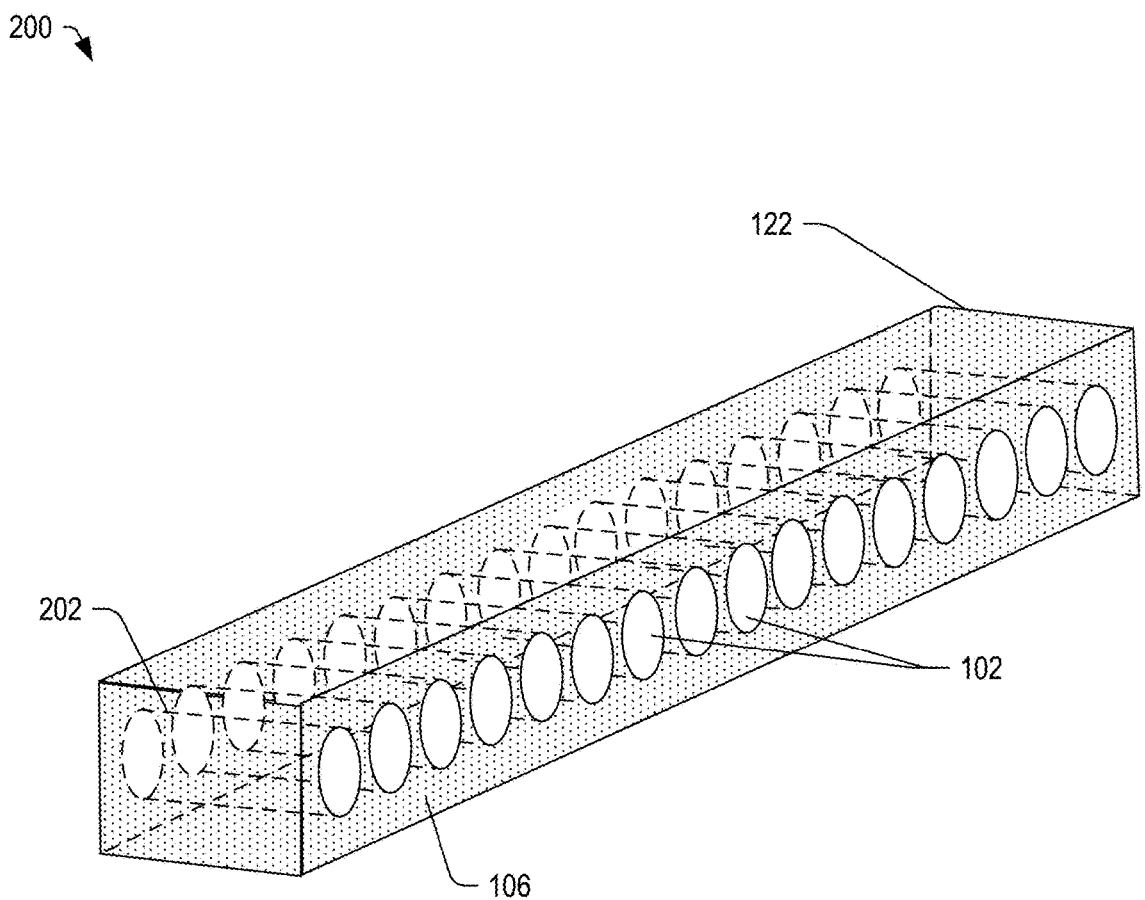
FIG. 2 depicts a partially transparent perspective view of the charge storage component holder of FIG. 1C, in accordance with certain embodiments of the present disclosure.

FIG. 2 depicts a partially transparent perspective view 200 of the charge storage component holder 122 of FIG. 1C, in accordance with certain embodiments in the present disclosure. In the illustrated example, the charge storage component holder 122 has a substantially rectangular shape and includes a plurality of openings configured to receive energy storage components 102. The charge storage component holder 122 may include a plurality of pores or may be formed from a woven material configured to secure the PCM 106 and the plurality of energy storage components 102 and configured to allow the PCM 106 to contact the energy storage components 102. In some embodiments, the charge storage component holder 122 may include openings 202 sized to receive the energy storage elements 102 to maintain a consistent spacing.

It should be appreciated that the charge storage component holder 122 may be included or omitted, depending on the implementation. Further, other shapes or configurations of a holder 122 may be used, depending on the shape of the packaging of the charge storage components 102 and depending on the shape and size of the enclosure provided by the housing 108 or the VIPs 110.

While the embodiments of FIGS. 1A-2 are directed to devices that include charge storage components 102 (such as batteries), other embodiments are also possible. In an example, the device may include a circuit in addition to or in lieu of the charge storage components 102. Further, the embodiments described above with respect to FIGS. 1A-2 may be used alone or with a plurality of energy storage devices. One possible embodiment of a thermally regulated modular energy storage device that includes one or more of the energy storage devices of FIGS. 1A-2 is described below with respect to FIG. 3.

Figure 3:
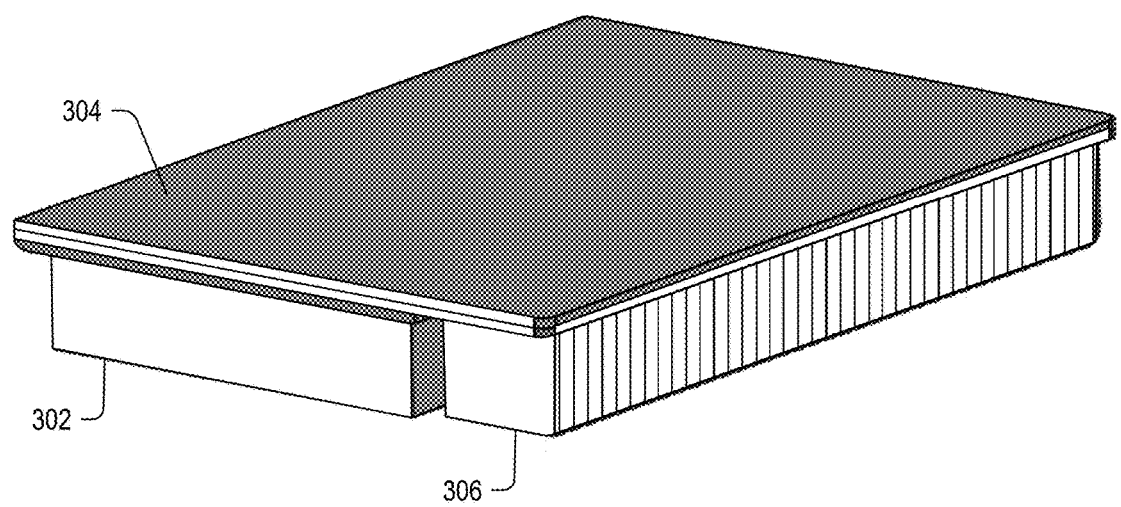
FIG. 3 depicts a perspective view of a thermally regulated modular energy storage device including an energy storage device with integrated thermal regulation, in accordance with certain embodiments of the present disclosure.

FIG. 3 depicts a perspective view of a thermally regulated modular energy storage device 300, in accordance with certain embodiments of the present disclosure. The thermally regulated modular energy storage device 300 may include a base portion 302 coupled to a cover portion 304. The base portion 302 and the cover portion 304 may cooperate to define an enclosure size to receive a plurality of energy storage devices, such as the energy storage devices described above with respect to FIG. 1A-2. The thermally regulated modular energy storage device 300 may further include a plurality of heat fins of a heat sink 306, which may be coupled to each of the plurality of energy storage devices by one or more heat transfer elements, such as heat pipes or tubes.

In a particular embodiment, each of the one or more heat transfer elements may include a partially evacuated tube or heat pipe filled with a liquid, such as distilled water or acetone, which may be configured to carry heat away from the PCM 106 to at least one of the plurality of heat fins of the heat sink 306. Ambient or active air flow across the heat sink 306 can draw heat away from the heat pipes, dissipating the heat. In operation, as the energy storage components 102 heat up, the PCM 106 may melt and flow, delivering heat from the energy storage components 102 to the one or more heat transfer elements and to the heat sink 306. Each of the plurality of heat fins of the heat sink 306 may be configured to allow for airflow between the fin and an adjacent fin, facilitating heat dissipation.

The thermally regulated modular energy storage device 300 may include a plurality of energy storage devices 100 or 120 of FIG. 1A or 1C, respectively. The thermally regulated modular energy storage device 300 may be configured to control the temperature of the device 300 to remain within a predetermined temperature range. In particular, as the temperature of the energy storage components 102 increases, the PCM 106 may melt and flow drawing heat away from the energy storage components 102. Further, one or more heat pipes may be configured to draw heat from the PCM 106 and deliver the heat to the heat sink 306 to further dissipate the heat. In some embodiments, the heat pipe or tube may be kinked or bent to provide gravity-assisted unidirectional heat flow even when the device is placed horizontally. Alternatively, the heat pipe or tube may include a Venturi tube, a valve, or other structure configured to restrict fluid flow in a first direction (toward the PCM 106) while allowing fluid flow in the second direction (away from the PCM 106).

The thermally regulated modular energy storage device 300 may include a housing 302 and 304 configured to secure the energy storage components 102 and associated thermal management components. In a particular implementation, the base portion 302 of the housing may have a wall thickness of approximately 3 mm. The cover portion 304 may have a wall thickness of approximately 2 mm.

In some embodiments, the plurality of energy storage components 102 and the PCM 106 may be secured between a top plate having a wall thickness of approximately 6 mm and a bottom plate having a wall thickness of approximately 2 mm. The top and bottom plates may be secured to one another by spring-loaded screws, which apply a clamping force. In some embodiments, PCM 106 may fill gaps between the base portion 302, the cover portion 304, and the top and bottom plates and the energy storage components 102.

In some embodiments, a plurality of fluid-filled tubes may be coupled to or integrated with the top plate and may be coupled to the heat sink 306 through a thermal rectifier portion, which may be implemented as a bent or kinked portion extending between a first horizontal portion and a second horizontal portion of each of the plurality of fluid-filled tubes to provide gravity-assisted unidirectional heat flow even in a horizontal orientation of the device.

Additionally, one or more vacuum-insulated panels may be included within the housing, which may be configured to retain heat. When the ambient temperature is greater than a pre-determined threshold, the heat pipes may be active to draw heat away from the PCM 106 and dissipate the heat through the heat sink 306. When the ambient temperature is below the threshold, the heat pipes may be inactive to retain heat within the device. In a particular example, the temperature threshold may be configured based on the composition of the fluid and the fluid pressure within the heat pipe. In a particular example, when the ambient temperature is above a threshold temperature, vapor may rise through the heat pipe. When the ambient temperature is at or below the threshold temperature, the vapor may not rise. Other embodiments are also possible.

Figure 4A:
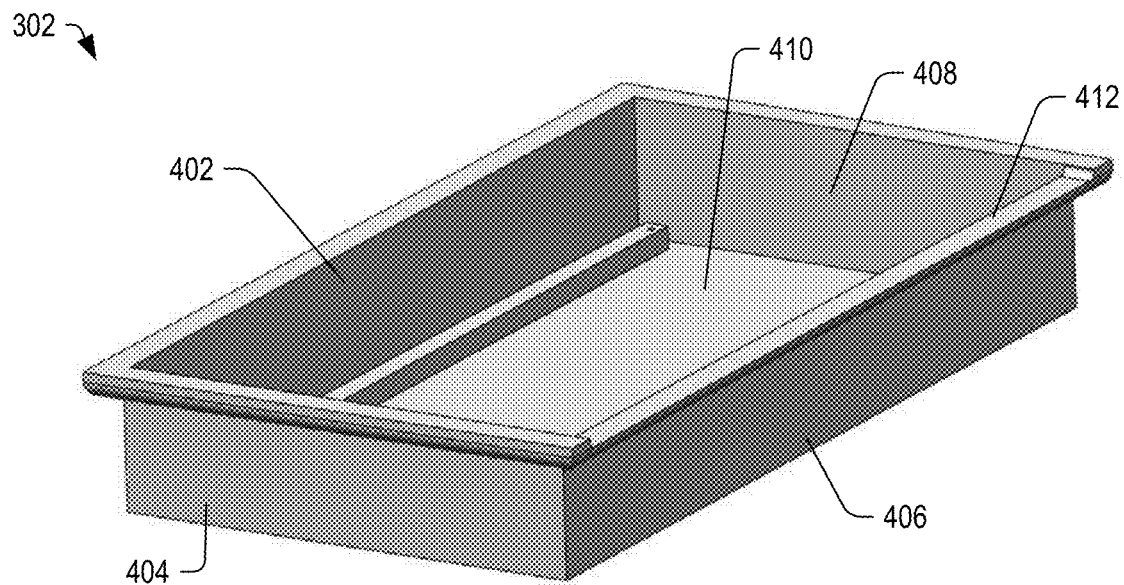
FIG. 4A depicts a side perspective view of a base portion of the housing of the thermally regulated modular energy storage device of FIG. 3, in accordance with certain embodiments of the present disclosure.

FIG. 4A depicts a side perspective view of a base portion 302 of the housing of the thermally regulated modular energy storage device 300 of FIG. 3, in accordance with certain embodiments of the present disclosure. The base portion 302 may include a first side 402, a second side 404, a third side 406, a fourth side 408, and a bottom 410. The third side 406 may be slightly shorter than the adjacent sides 404 and 408, providing spacing for the heat pipe or tube to extend toward the heat sink 306. The base portion 302 may cooperate with the cover 304 to define the enclosure sized to secure a plurality of devices, such as the device 100 in FIG. 1A or the device 120 in FIG. 1C.

Figure 4B:
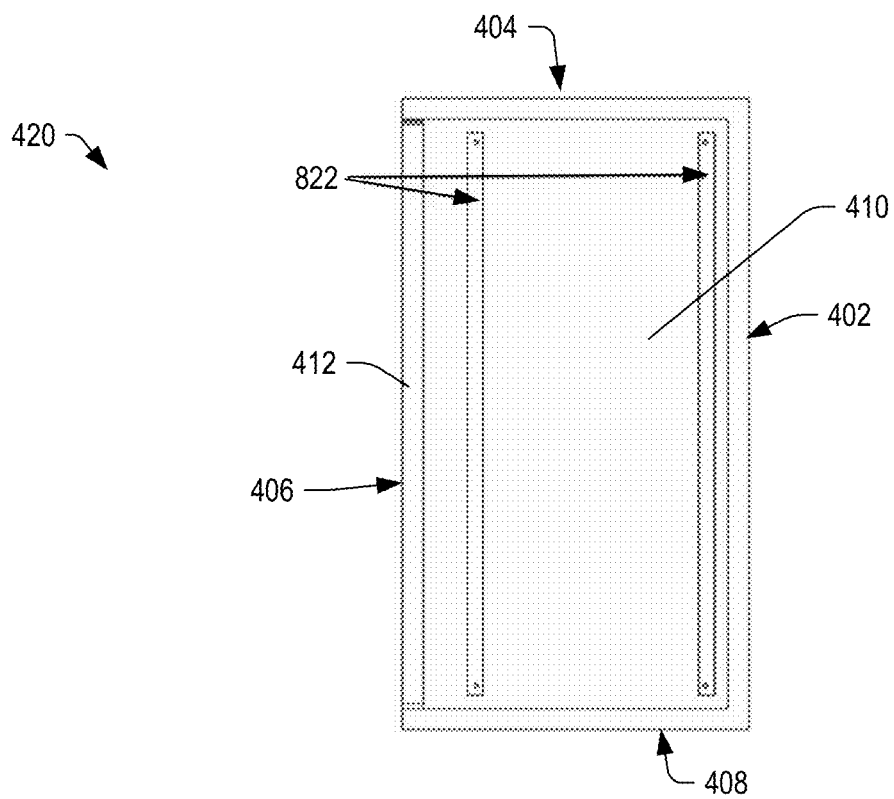
FIG. 4B depicts a top view of the base portion of FIG. 4A including support rails configured to support the battery subassembly.

FIG. 4B depicts a top view 420 of the base portion 302 of FIG. 4A including support rails 422 configured to support the battery subassembly. The support rails 422 provide spacing between the interior surface of the base portion 302 and the device 100 in FIG. 1A or the device 120 in FIG. 1C.

Figure 5A:
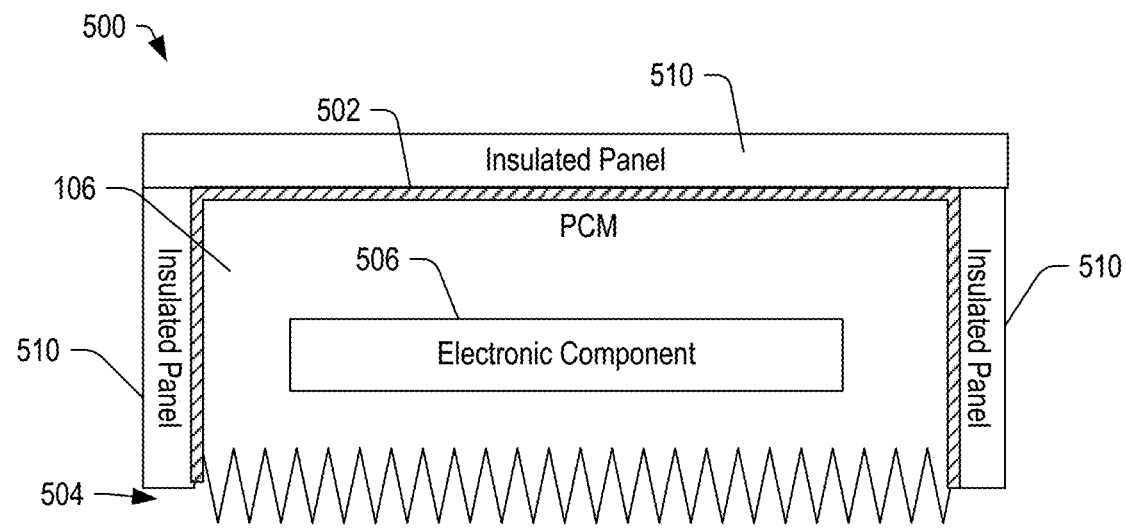
FIG. 5A depicts a block diagram of an alternative embodiment of a device including integrated thermal regulation, in accordance with certain embodiments of the present disclosure.

FIG. 5A depicts a block diagram of an alternative embodiment of a device 500 including integrated thermal regulation, in accordance with certain embodiments of the present disclosure. In the illustrated example, the device 500 may include a housing 502 defining an enclosure sized to receive the PCM 106 and an electronic component 506 within the PCM 106. In this example, the device 500 may further include a plurality of insulated panels 510 about all but one of the sides of the housing 502. The insulated panels 510 may be embodiments of the VIP 110 in FIGS. 1A and 1B. One side of the housing 502 may include a heat sink 504 including a plurality of heat fins to dissipate heat.

Figure 5B:
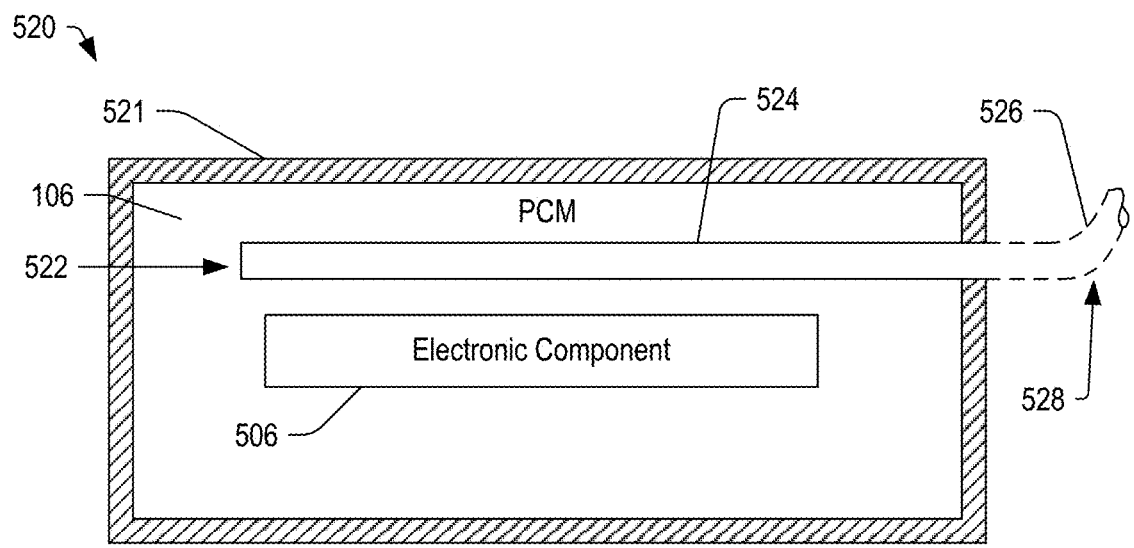
FIG. 5B depicts a block diagram of another embodiment of a device including integrated thermal regulation, in accordance with certain embodiments of the present disclosure.

FIG. 5B depicts a block diagram of another embodiment of a device 520 including integrated thermal regulation, in accordance with certain embodiments of the present disclosure. In the illustrated example, the device 520 includes a housing 521, which may be formed from a thermally insulative material, such as the VIP 110 in FIGS. 1A and 1B. The housing 521 may define an enclosure to receive and secure the PCM 106 and an electronic component 506 (such as an electrical circuit, a charge storage component, or any combination thereof). The device 520 may further include a heat pipe 522 including a proximal portion 524 extending through the VIP 110 and into the enclosure, in contact with the PCM 106. The heat pipe 522 may further include a distal portion (shown in FIGS. 6A and 6B) and an intermediate portion 526.

In the illustrated example, the device 520 may include a housing 521, which may be formed from VIPs 110 that can cooperate to define the enclosure. The proximal portion 524 of the heat pipe 522 may extend through a sidewall of the housing 521 and into the PCM 106. The intermediate portion 526 of the heat pipe 522 may include an upward bend 528, which may operate to render the heat pipe 522 unidirectional.

In some embodiments, the upward bend 528 may be sufficient to raise the distal end of the heat pipe 522 to an elevation that is greater than the proximal end 524. In one particular embodiment, the upward bend 528 may have approximately a ninety degree angle. In another particular embodiment, the upward bend 528 may have an arc angle of between 15 and 50 degrees. Other embodiments are also possible. Other embodiments are also possible.

Figure 6A:
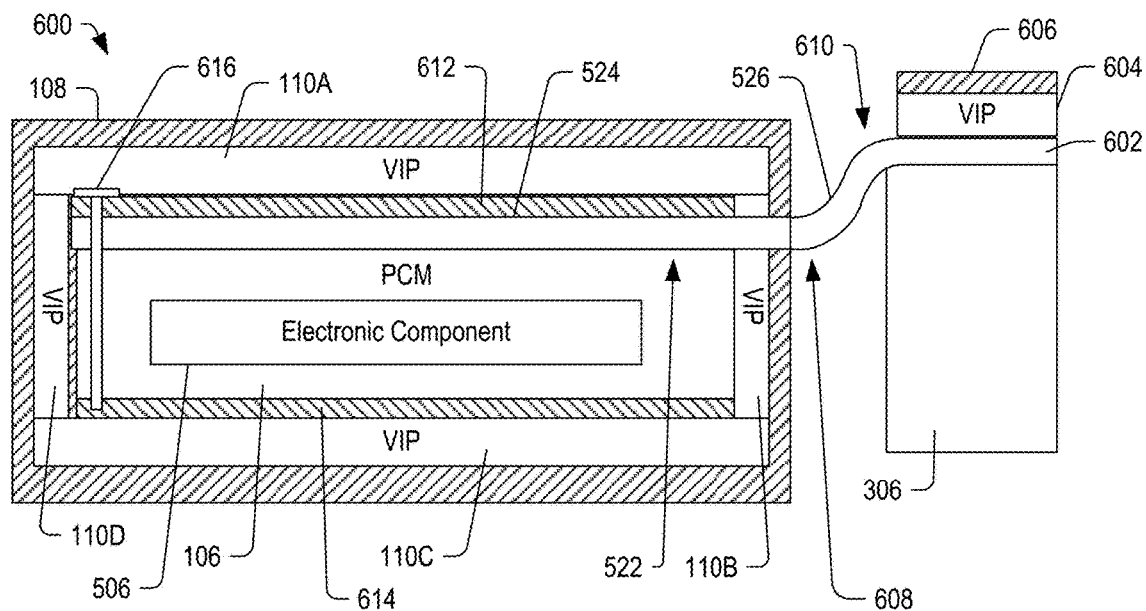
FIG. 6A depicts a block diagram of a device including thermal regulation that includes a heat pipe and a heat sink, in accordance with certain embodiments of the present disclosure.

FIG. 6A depicts a block diagram of a device 600 including thermal regulation that includes a heat pipe 522 and a heat sink 306, in accordance with certain embodiments of the present disclosure. The device 600 may include a housing 108 defining an enclosure sized to secure a plurality of insulation panels, such as VIPs 110A, 110B, 110C, and 110D. Further, the enclosure is sized to receive an upper plate 612, a lower plate 614, and a fastener 616. In some embodiments, the fastener 616 may be one of a plurality of spring-loaded screws configured to secure the upper plate 612 to the lower plate 614, compressing the PCM 106 in between the upper plate 612 and the lower plate 614. The electronic component 506 may be positioned within the PCM 106.

The heat pipe 522 may include a proximal portion 524 that extends within the PCM 106 or within a channel defined in the upper plate 612. The heat pipe 522 may further include a distal portion 602 coupled to the heat sink 306, and may include an intermediate portion 526 extending between the proximal portion 524 and the distal portion 602. The intermediate portion 526 can include an upward bend 608 and a downward bend 610 configured to adjust an elevation of the distal portion 602 to be elevated relative to the proximal portion 524.

In the illustrated example, an insulation panel, such as a VIP 604, may be positioned on the distal portion 602, and a cover portion 606 may be coupled to the VIP 604. In other embodiments, the VIP 604 may be omitted from the distal portion 602, or the cover portion 606 may include a VIP insulation material. Other embodiments are also possible.

Figure 6B:
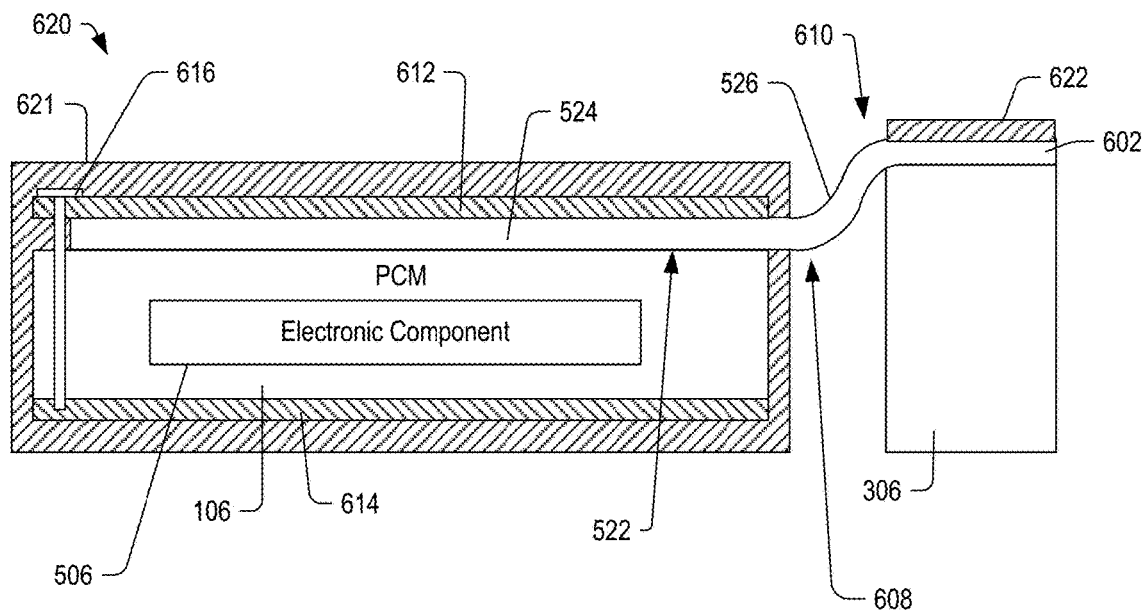
FIG. 6B depicts a block diagram of another embodiment of a device thermal regulation that includes a heat pipe and a heat sink, in accordance with certain embodiments of the present disclosure.

FIG. 6B depicts a block diagram of another embodiment of a device 620 including thermal regulation that includes a heat pipe and a heat sink, in accordance with certain embodiments of the present disclosure. The device 620 can include a housing 621 formed from insulating material. In a particular example, the housing 621 may be formed from one or more VIPs 110. The housing 621 may define an enclosure sized to receive the upper plate 612, the lower plate 614, the fastener 616, the PCM 106, the electronic component 506, and at least a portion of the heat pipe 522. The heat pipe 522 may include a proximal portion 524 that may extend through the VIP housing 110 into the PCM 106 or within a channel of the upper plate 612. The heat pipe 522 may further include a distal portion 602 coupled to the heat sink 306, and an intermediate portion 526 that extends between the proximal portion 524 and the distal portion 602. The intermediate portion 526 may include bends 608 and 610 that may cooperate to elevate the distal portion 602 relative to the proximal portion 524.

It should be appreciated that the thermal regulation of the electronic device can be provided for a variety of contexts, including solar panels, internal combustion engine or electric vehicles, high-end processing circuits, and so on. Moreover, the thermal regulation can maintain the device within a selected operating temperature range, protecting the device from overheating and from extreme cold temperatures. One possible example that utilizes the devices in FIGS. 3-6B may be utilized behind a solar panel installation, as described below with respect to FIG. 7.

Figure 7:
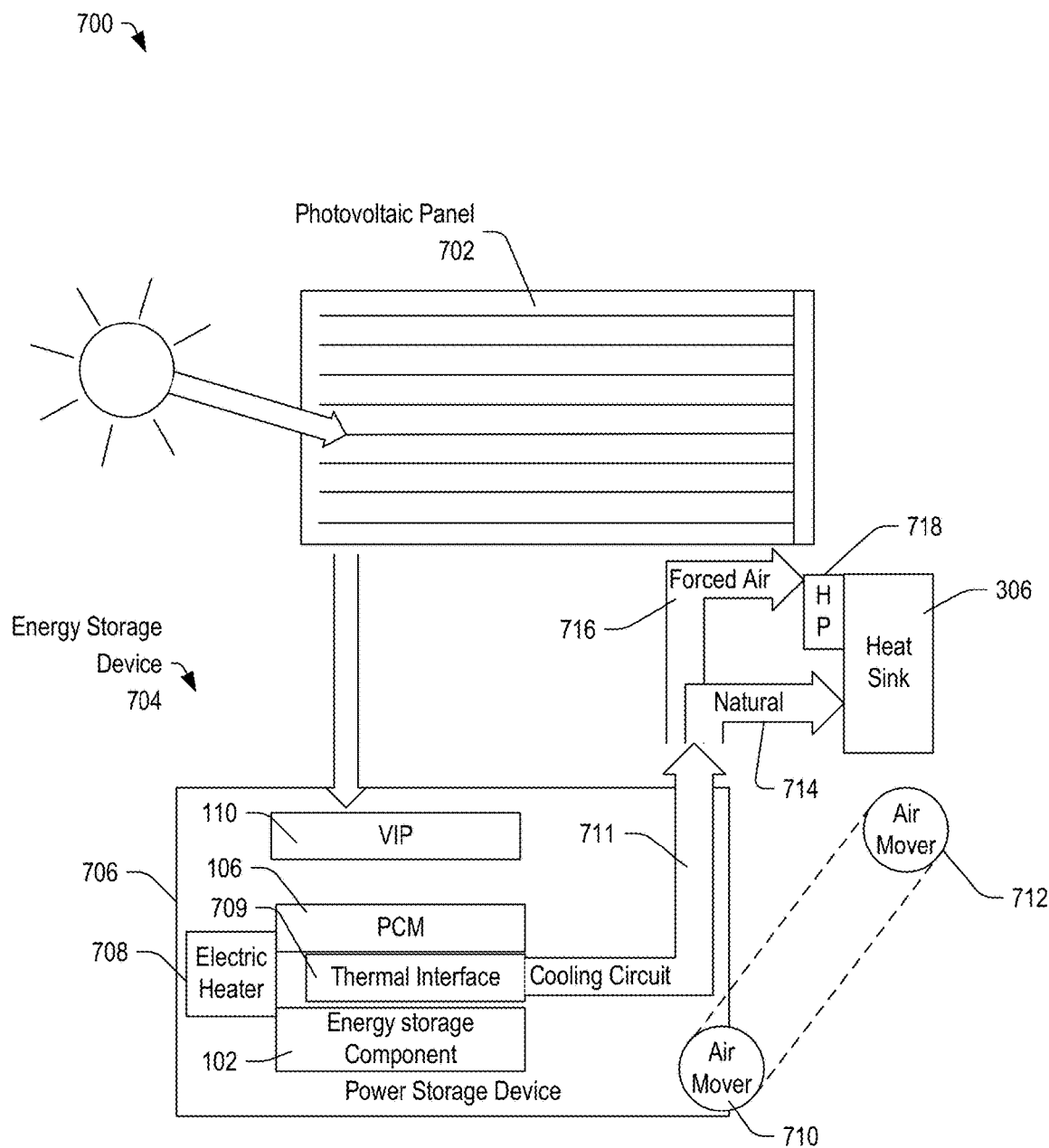
FIG. 7 depicts a system including a photovoltaic panel and a thermally regulated modular energy storage device, in accordance with certain embodiments of the present disclosure.

FIG. 7 depicts a system 700 including a photovoltaic panel and a thermally regulated modular energy storage device, in accordance with certain embodiments of the present disclosure. The system 700 may include a photovoltaic panel 702 configured to operate in conjunction with a modular energy storage device 704, which can be electrically coupled to the photovoltaic panel 702. The modular energy storage device 704 may be an embodiment of the modular energy storage device FIGS. 3-6B and may include the charge storage devices 100 or 120 in FIG. 1A or 1C, respectively.

In some embodiments, the modular energy storage device 704 may be mounted to an existing photo-voltaic (PV) solar panel frame or rail. The modular energy storage device 704 may be mounted to the same mounting rails used by the photovoltaic panel 702. In some embodiments, the modular energy storage device 704 may be mounted adjacent to the photovoltaic panel 702 such that an air gap exists between the photovoltaic panel 702 and the modular energy storage device 704.

In a particular implementation, the modular energy storage device 704 may have dimensions of 11 inches×19 inches×3 inches. In some embodiments, an air gap facilitates convective cooling of the photovoltaic panel 702 and provides thermal isolation for the modular energy storage device 704 from photovoltaic panel 702.

In some embodiments, the mounting of a modular energy storage device 704 can be adjustable. In some embodiments, the modular energy storage device 704 may be mounted in a "landscape" or "portrait" orientation. Further, the modular energy storage device 704 can be separately mounted at some distance below the photovoltaic panel 702.

It should be appreciated that the modular energy storage device 704 may be configured for a series circuit configuration and/or a parallel circuit configuration. The modular energy storage devices 704 may be electrically coupled to one another and optionally to the power grid to form a larger, scalable, energy storage system. In some embodiments, a modular energy storage device 704 may be installed indoors and may include various mechanisms for thermal regulation.

In the illustrated example, the energy storage device 704 may include a thermally reflective coating 706 on an exterior surface of the housing. In some embodiments, the thermally reflective coating 706 can reduce heat transfer by radiating or reflecting over 90% of solar radiation away from the coated surface. In some embodiments, the thermally reflective coating 706 may be configured to amplify the energy production from the photovoltaic panel 702, such as, for example, by radiating or reflecting the light toward a bifacial solar panel.

In addition to the thermally reflective coating 706, the modular energy storage device 704 may include an energy storage component 102 and the PCM 106 separated by a thermal interface 709. In some embodiments, the energy storage device 704 can include an electric heater 708, a cooling circuit 711, heat sink 306, and optionally one or more air movers 710 and 712 (such as fans, bearing-less air movers, or other types of air movers). Further, the energy storage device 704 can include a plurality of VIPs 110.

In some embodiments, a mechanism for thermo-regulation of the modular energy storage device 704 may include a bearing-less air-mover 710 and 712. In some embodiments, a bearing-less air-mover 710 and 712 may include one or more synthetic jet generators, one or more electrostatic fluid accelerators, or another type of air moving device. In some embodiments, a bearing-less air-mover can produce an air flow rate reaching 2-4 meters/second. In certain embodiments, the forced movement of air may reduce the air temperature surrounding the modular energy storage device 704. Additionally, the efficiency and life of the photovoltaic panel 702 and modular energy storage devices 704 may be improved by decreasing their respective average operating temperatures.

In some embodiments, a mechanism for thermo-regulation of a modular energy storage device 704 may include the VIPs 110. As the rate of heat exchange depends, at least in part, on thermal conductivity, a reduction in thermal conductivity may reduce the rate of heat exchange between the ambient air and the interior of the energy storage device 704. In some embodiments, a VIP 110 can have an R-value of approximately 15. Further, in some embodiments, the VIP 110 may provide a flame retardant barrier for the modular energy storage device 704. The VIPs 110 may substantially surround an energy storage component 102 of a modular energy storage device 704 and may, in some embodiments, also surround one or more mechanisms for thermo-regulation. In some embodiments, the VIP 110 may be enclosed inside an airtight chamber, which can improve the predicted lifespan of the modular energy storage device 704. In some embodiments, the VIP 110 may be configured to accommodate a reduction in insulating capability over time, such as when the vacuum seal begins to deteriorate.

In some embodiments, a mechanism for thermo-regulation includes passive thermal buffering using the PCM 106. The PCM 106 may be a substance with a high heat of fusion, which is capable of storing and releasing large amounts of energy in the form of heat. The PCM 106 may be selected based on its temperature of solid-liquid phase change, energy density per unit volume, or another suitable characteristic. In some embodiments, the PCM 106 can be comprised substantially of an organic material, substantially of paraffin, another material, or any combination thereof. In some embodiments, the PCM 106 can provide flame-retardant capabilities. Further, the temperature range of the PCM 106 can be chosen based on the performance criteria of a modular energy storage device 704. For example, the PCM 106 may be chosen with a temperature range having a lower bound greater than a minimum operating temperature of the modular energy storage device 704 and an upper bound less than a maximum operating temperature of the modular energy storage device 704.

In some embodiments, the PCM 106 can maintain a temperature range of 32-78° F. In the illustrated example, the PCM 106 surrounds an energy storage component 102 within the modular energy storage device 704. A dimension or parameter of the PCM 106 may be selected based, at least in part, on an operational parameter or ambient temperature profile of an energy storage component 102. In some embodiments, the PCM 106 can be encapsulated within an organic polymer or micro-encapsulated within a graphite polymer. In some embodiments, the graphite polymer may ensure leak free operation with a high conductivity through the volume of the PCM 106. In some embodiments, an encapsulating organic polymer can facilitate heat transfer.

In some embodiments, the PCM 106 absorbs heat and melts, storing the heat energy in a liquid phase. The PCM 106 can release its stored energy when the ambient temperature falls below a set threshold. In some embodiments, releasing energy from the PCM 106 buffers the temperature inside the energy storage device 704. In some embodiments, the PCM 106 stores energy throughout a day and rejects the energy during the subsequent night.

In some embodiments, the passive-active thermo-regulation system may include passive elements (such as the PCM 106 and the heat pipe) and may include active elements, such as air movers 710 and 710. The passive-active thermo-regulation system may reduce the overall energy consumption of a modular energy storage device 704, improving its life expectancy and its efficiency.

In some embodiments, the modular energy storage device 704 may include one or more energy storage components 102, such as a Lithium-ion battery. The energy storage components 102 may have an energy storage capacity of approximately 750 Watt-hours.

In some embodiments, the circuit 502 of the modular energy storage device may include control circuitry, which may be agnostic to the type of battery being used. The circuit 502 may include a smart battery management system configured to supervise and control one or more of a charging rate, a discharge rate, a charge state, a health parameter, a remaining life, and a temperature regulation system. In some embodiments, a smart battery management system can maintain a charge storage device in a selected temperature range.

In a particular embodiment, the energy storage component 102 can be coated with an intumescent material, which may help to isolate specific cells in case of thermal events. In some embodiments, an intumescent material spatially restricts a thermal event. In some embodiments, spatially restricting a thermal event reduces compounding of the thermal event and improves the safety of a modular energy storage device 704.

The energy storage device 704 may include one or more thermal flow interfaces configured to conduct heat from one or more of the PCM 106 and the charge storage device 102 to a cooling circuit 711. In some embodiments, a thermal interface uses coatings of an organic polymer, graphite, graphene, other coatings, or any combination thereof. In some embodiments, the thermal interface 709 may include a highly conductive metal plate coated with one or more coatings. In some embodiments, the thermal interface 709 may have a thermal conductivity of 140-500 W/mK. In some embodiments, the thermal interface 709 may be implemented as the top plate 402, which may be a highly conductive metal plate including channels 504 for thermally coupling to a cooling circuit via proximal ends of a plurality of heat pipes. The thermal interface 709 may distribute heat and also transfers the heat away from the energy storage component 102 and the PCM 106.

In some embodiments, a mechanism for thermo-regulation may include a cooling circuit 711, which includes one or more heat pipes. In some embodiments, the cooling circuit 711 may include a wickless thermosiphon. The cooling circuit 711 may have an operating temperature higher than about 15° C. The heat pipe may utilize methanol, distilled water, or another fluid as an operating fluid. The heat pipe may be coupled the thermal interface 709, channels 504 within the top cover 402, the PCM 106, or any combination thereof.

In some embodiments, the heat pipe may be configured to ensure a substantially unidirectional heat flow. In an example, the heat pipe allows heat to flow from the interior to the exterior of a modular energy storage device 704 (or 300 in FIGS. 3-10). In some embodiments, gravity assisted heat pipes reduce backflow from the exterior of a modular energy storage device 704 (or 300 in FIGS. 3-10) by arranging the modular energy storage device on an incline with the distal end of the heat pipe raised relative to the proximal end (where the proximal end is within or in contact with the PCM 106. In some embodiments, a reduced backflow improves the efficiency of the modular energy storage device 704 (or in the energy devices in FIGS. 3-6B). Additionally, in some embodiments, the modular energy storage device 704 may not include any actuating mechanical parts or pumped liquids.

In operation, heat may be rejected from the modular energy storage device 704 when the temperature of the ambient air around the modular energy storage device 704 is lower than the temperature of the interior of the modular energy storage device 704. The heat may be rejected via a cooling circuit 711 (or the cover portion 304, the intermediate portion 526, and the heat sink 306 in the devices of FIGS. 3-6B). In some embodiments, the condenser side of a heat pipe array may be attached to the heat sink 306, enabling heat elimination based on natural convection. In some embodiments, the modular energy storage device 704 can include a plurality of cooling circuits 711. The modular energy storage device 704 can include a plurality of heat sinks 306. Further, one or more of a quantity, placement, geometry, angle, or conductivity of a cooling circuit 711 may be based, at least in part, on one or more of the final geometry and cooling rate selected for the modular energy storage device 704.

In some embodiments, a mechanism for thermo-regulation may include air movers 710 and 712, which may be implemented as a piezoelectric fan or synthetic jet air mover, which can increase the ambient air flow rate over the heat sinks 306. In some embodiments, a combination of piezoelectric fans and synthetic jet blowers can be used to enhance air flow. Increasing the ambient air flow rate can increase the heat rejection rate of the modular energy storage device 704 as well as the solar panel 702 mounted near the storage device 704 to improve the efficiency of both devices. Accordingly, selection of a piezoelectric fan or synthetic jet blower may be based on the design and performance specifications of the modular energy storage device 704. In some embodiments, electromagnetic diaphragm based synthetic jet or piezoelectric fans may improve the outdoor ruggedness and may increase the efficiency of the modular energy storage device 704.

Further, the electromagnetic diaphragm based synthetic jet or piezoelectric fans may enable a self-cleaning effect for the heat sink's fins 306. Additionally, use of piezoelectric fans or synthetic jet blowers enables a reduction in size of the heat rejection fins of the heat sink 306. In some embodiments, design of one or more of the mechanisms for thermo-regulation may be configured to benefit from the Coandă effect, from atmospheric or fluid entrainment, or from some other environmental or physical fluid flow parameter.

While the above-discussion has largely focused on passive thermal rejection using heat pipes, PCM 106, and heat sink 306 to dissipate heat from the device, it is also possible to utilize one or more active components to facilitate rejection of heat. In some embodiments, the modular energy storage device 704 may include a thermo-electric heat pump, which may transfer heat from the heat pipe array to a heat sink. In some embodiments, this heat sink may differ from a heat sink attached to the heat pipe array, and a plurality of heat pipes and heat sinks may be used. Again, one or more of a quantity, location, design, or final geometry of these heat pipes and heatsinks is based on the cooling rate demanded for a modular energy storage device.

In a particular embodiment, the modular energy storage device 704 may be designed to work with commercially available solar panel cell modules, such as, for example, 24, 36, 60, 72, or 96 cell modules of varying voltage and wattage levels. The modular energy storage device 704 may connect with a photovoltaic panel 702 and with other modular energy storage devices 704 using existing positive and negative terminals, such as, for example, a Multi-Contact 4 mm diameter (MC4) connector or other connectors or terminals. The output of the modular energy storage device 704 may be configured to be electrically connected to one or more microinverters, to be electrically daisy-chained to other modular energy storage devices 704 via direct current (DC) coupling in both series or parallel configurations, or to be daisy-chained to other modular energy storage devices 704 via an alternating-current (AC) coupling. The alternating-current coupling may be achieved using synchronized microinverters.

It should be appreciated that the modular energy storage device 704 may be modular and scalable. Additional modular energy storage devices 704 may be added to an existing system 700 in order to scale energy storage capabilities. In some embodiments, modular energy storage devices 704 are configured for residential installation, commercial installation, utility grade installation, or any combination thereof.

In the illustrated example, the modular energy storage device 704 may include an internal or electrical heater 708, which may be self-contained. A control circuit or battery management system may be configured to control the electrical heater 708. The electrical heater 708 may be configured to pre-heat the energy storage component 102 to maintain an ideal range of operating temperature for the energy storage component 102. In some embodiments, a combination of active and passive thermal regulation of the energy storage component 102 can maintain nominal operation and temperature around 80° F. for up to 8 hours under ambient conditions of up to 150° F.

The modular energy storage device 704 can include an energy storage component 102 and a plurality of mechanisms for thermo-regulation. The energy storage component 102 may include a smart battery management system that also supervises and controls the discharging and charging rates, state of charge, state of health, or remaining life. The smart battery management system may further supervise and control a temperature regulation system to keep the battery in its suitable temperature range. The energy storage component 102 may be coated with an intumescent material configured for isolating specific cells in case of thermal events, such as, for example, thermal runaway. The intumescent material may prevent or limit the thermal event from spreading to adjacent cells and keeps the event restricted spatially, improving the safety of the energy storage component 102 and overall modular energy storage device 704.

A reflective coating 706 may be applied to the exterior of the modular energy storage device 704 to reduce the amount of heat entering the energy storage component 102 via thermal radiation. A bearing-less air-mover 710 may reduce the temperature of the ambient air around the modular energy storage device 704 by moving the hot air near the exterior of the modular energy storage device 704, such as, for example, between a photovoltaic (PV) module 702 and the modular energy storage device 704. VIPs 110 may form a flame retardant barrier around the energy storage component 102 and PCM 106. The VIP 110 may achieve a high R insulation value in tight space constraints.

The PCM 106 uses passive thermal buffering to maintain temperature of the energy storage component 102 at an appropriate range without any additional active temperature control. The PCM 106 can absorb heat flowing from the exterior of the modular energy storage device 704 as well as from the energy storage component 102 and associated power electronics, while maintaining a steady range of temperature until a majority of the PCM 106 is fully melted.

The thermal interface 709 may be configured to transfer heat from both the PCM 106 and energy storage component 102 to a cooling circuit 711. The thermal interface 709 may use coatings of graphite or graphene on a highly conductive metal plate with channels in thermally conductive connectivity with the cooling circuit 711. The cooling circuit 711 may include a wickless, thermosiphon heat pipe, or a plurality thereof, connected with the thermal interface 709 to ensure a substantially unidirectional heat flow from the modular energy storage device 704 to the ambient air. Gravity assisted heat pipes in the cooling circuit 711 can greatly reduce heating back flow from the ambient air into the modular energy storage device 704. The cooling circuit 711 can be configured with an insulated adiabatic section, which can reduce heat transfer from the ambient air to the inside of the modular energy storage device 704 via a heat pipe's exterior.

A natural convection heat rejection path 714 may pass heat drawn from the interior of the modular energy storage device 704 into the ambient air by the heat sink 306. One side of the natural convection heat rejection path 714 may be coupled to the cooling circuit 711. An active cooling heat rejection path 716 may couple the cooling circuit 711 to a heat-pump device 718 by means of a thermal interface. The thermal interface ensures the temperature of the condenser portion of the cooling circuit 711 is low enough for the cooling circuit 711 to pump out heat.

A piezoelectric fan 712 may move air over the heat sink 306 and increases the heat rejection rate. The thermo-electric heat pump 718 may be configured to transfer heat from the cooling circuit 711 to the heat sink 306 when the ambient air temperature is not low enough for system cooling requirements. The modular energy storage device 704 can be electrically coupled to photovoltaic module 702. The modular energy storage device 704 may be mounted on an adjustable rail mount to which the photovoltaic module or panel 702 is mounted in such a way that an air gap is maintained between the PV panel 702 and the modular energy storage device 704.

The electric heater 708 may be configured for controlled heating of the modular energy storage device 704, and in particular of the energy storage component 102. By employing the electric heater 708 to pre-heat the energy storage component 102, the energy storage component 102 can be maintained within its ideal operating temperature range.

In some embodiments, a temperature regulation system can be configured to control the operation of the various thermal regulation mechanisms such as, for example, bearing-less air mover 710 and piezoelectric fan 712. The temperature regulation system, the battery management system, and the battery charging system may be configured to draw power from a plurality of sources, such as the DC output of the PV panel 702, the DC output of the energy storage component 102, the AC input from a grid connection, or the AC output from an external power source such as, for example, a generator.

Figure 8:
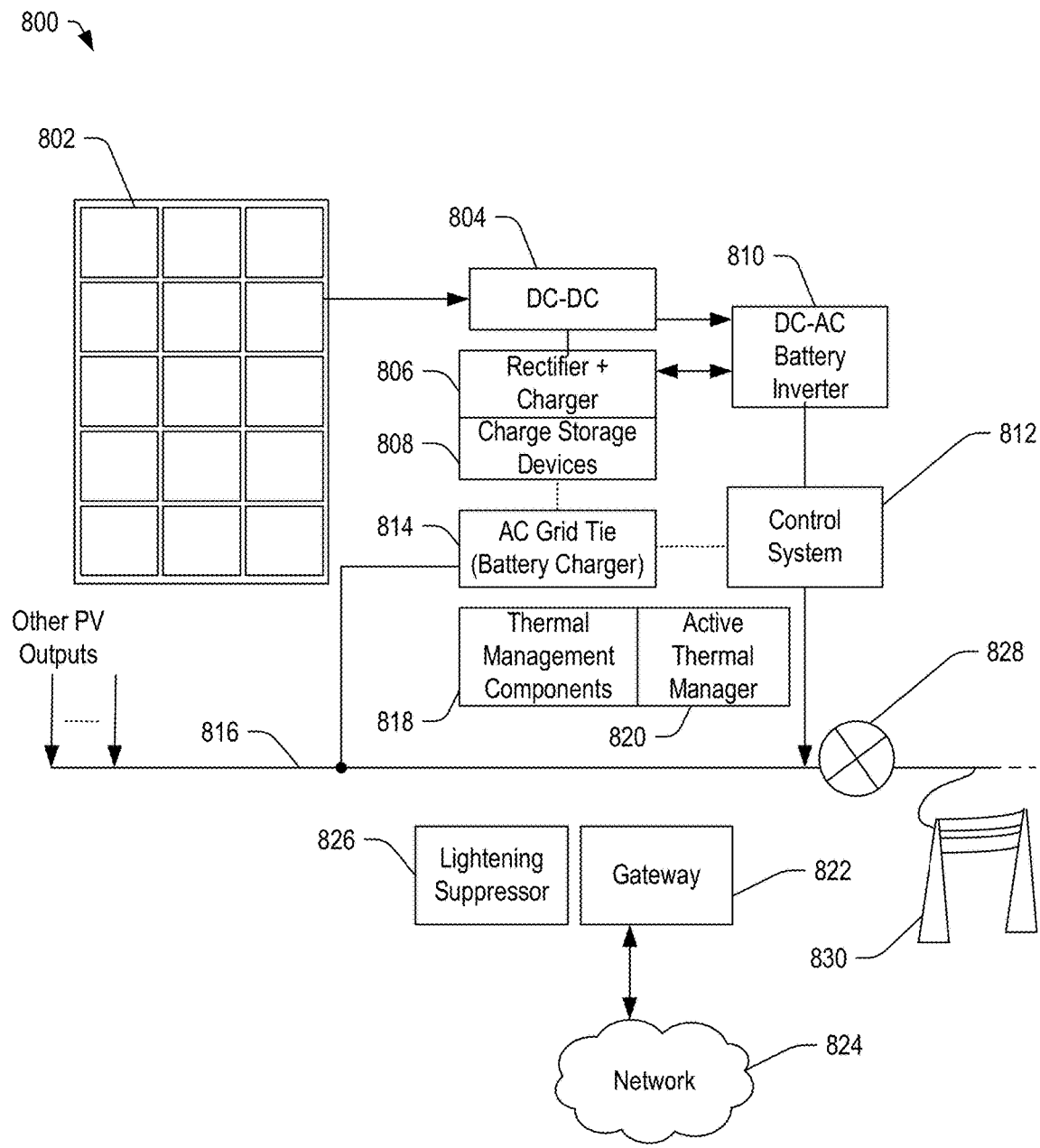
FIG. 8 depicts a block diagram of the system of FIG. 7 and including an electrical system of a modular energy storage device control system, in accordance with certain embodiments of the present disclosure.

With reference now to FIG. 8, a block diagram of a modular energy storage device 800 is shown according to another embodiment. DC power may be generated by a photovoltaic panel 802 and may be transmitted from the PV panel 802 to a Maximum Power Point Tracker (MPPT) DC-to-DC converter 804, which may be configured to transmitting power either directly to a DC-AC inverter 810 or to a rectifier and DC battery charger 806. The DC-AC inverter 810 may also be configured to communicate power to and from the rectifier and DC battery charger 806. The rectifier and DC battery charger 806 may be configured to communicate power to charge storage devices 808, which may be controlled by a battery management module of a control system 812. The battery management module can control the discharging and charging rates, state of charge, state of health, and remaining life of the charge storage devices 808. An AC grid tie battery charger 814 may be configured to communicate power between the charge storage devices 808 and an AC power distribution system 816, including power lines 830 and a grid transfer switch 828.

A supervisory control unit or control system 812 may monitor the DC-AC inverter 810, the AC grid-tie battery charger 814, and a branch of the AC power distribution system 816. The device 800 may include thermal management components or hardware 818 and an active thermal manager 820 to regulate the temperature of the various electronic components. The MPPT DC-DC converter 804, the DC-AC inverter 810, the battery manager (which may be part of the control system 812), the control system 812, the AC grid-tie battery charger 814, and the passive-active thermal management components 818 and active thermal manager 820 may be configured to internally transmit and receive data, and optionally to send and receive data through a network 824 (such as the Internet) to a destination device via a PLC/Wi-Fi gateway 822.

Figure 9:
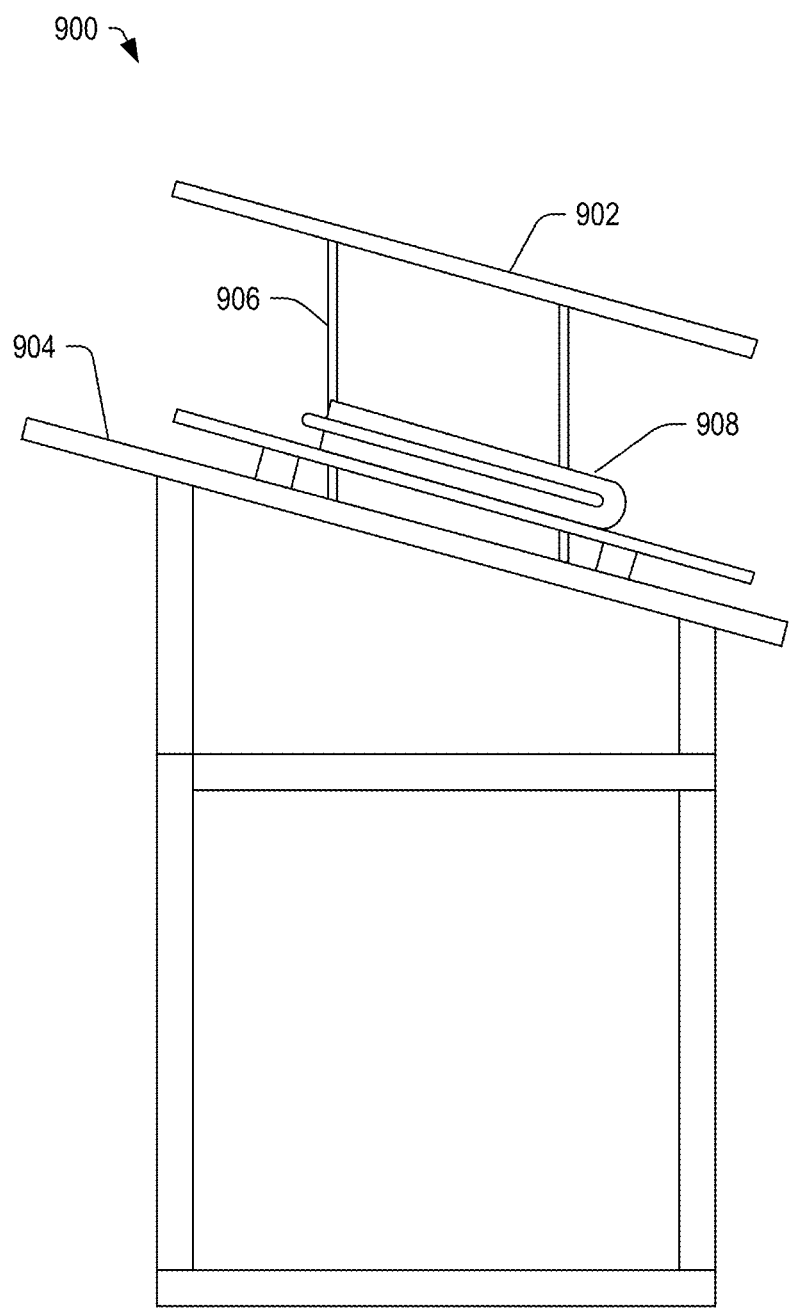
FIG. 9 depicts an example installation application of a modular energy storage device with integrated thermal regulation, in accordance with certain embodiments of the present disclosure.

With reference now to FIG. 9, a modular energy storage device 908 is shown according to another embodiment in which the modular energy storage device 908 is installed between a roof 904 and a rooftop PV panel 902. The modular energy storage device 908 can be adjustably mounted to the mounts or rail system 906 of the rooftop PV panel 902.

While the present disclosure describes embodiments of a thermal-regulated modular energy storage device, the passive cooling technique of using PCM 106, VIPs 110, and heat pipes with a heat sink 306 may be readily used with any number of energy sources, batteries, circuits, or other similar devices now known or hereafter developed. In some embodiments, the battery management system can be configured to draw power from a plurality of sources, including a DC output of the PV panel 902, a DC output of the energy storage component 102, the AC input from the grid connection, the AC output from a microinverter, or any combination thereof.

In some embodiments, the temperature regulation system draws power from a DC output of the PV panel 902, a DC output of the energy storage component 102, the AC input from the grid connection, the AC output from a microinverter, or any combination thereof. In some embodiments, the temperature regulation system draws power from a DC output of the PV panel 902, a DC output of the energy storage component 102, the AC input from the grid connection, the AC output from a microinverter, an alternate energy source (such as, for example, a gas or diesel generator or a fuel cell), or any combination thereof.

In some embodiments, a battery charging system draws power from a DC output of the PV panel 902, a DC output of the energy storage component 102, the AC input from the grid connection, the AC output from a microinverter, an alternate energy source (such as, for example, a gas or diesel generator or a fuel cell), or any combination thereof.

In some embodiments, the modular energy storage device may be configured to communicatively couple to a data network. The modular energy storage devices may be controlled remotely based on control signals received via the network.

In some embodiments, a temperature regulation system may include a thermal management module, which may be self-learning. In some embodiments, a thermal management module may use historic data based on geographic location, system usage, ambient temperature, weather conditions, other information, or any combination thereof. In some embodiments, the modular energy storage device facilitates a "nano-grid". Due to expensive grid connection costs, lack of utility infrastructure, ideological motivations, or any number of reasons, an individual may desire an energy generation system independent of or supplemental to a traditional grid-tie system. In some embodiments, a modular energy storage device may be connected to a transfer switch (such as the transfer switch 828 in FIG. 8) to facilitate energy storage and use independent of the status of the grid connection. In some embodiments, an energy generation system, such as a PV panel array, may be used in conjunction with a modular energy storage device independent of a grid-tie connection. In some embodiments, a plurality of energy generation systems and modular energy storage devices can be electrically coupled to a localized distribution network, which may be locally controlled by one of the modular energy storage devices and which can be controlled remotely over a data network.

In one example use case, a temporary settlement, such as a refugee camp, may need to have power for various communications, heating, cooking, or water purification equipment. Traditional power systems may not be feasible to install and generators may not be desirable to run continuously due to noise, budget, or health considerations. Instead, the settlement organizers could install PV panels or arrays on any supporting structures, with modular energy storage devices safely mounted behind the panels. These energy generation and modular energy storage devices could be used on a structure-by-structure basis, or could be connected into a localized distribution network.

In another example use case, a city wishes to improve the financial return on a renewable energy subsidy currently being offered. A modular energy storage device lowers installation costs and space demands of an energy storage system by fitting behind existing solar panels, for example. By adding the modular energy storage devices, the city could make renewable energy harvesting systems and energy storage systems economically feasible to a lower income segment of the population. This system would also be desirable to those already having installed energy harvesting systems, as the cost of retro-fitting their current system with a modular energy storage system may be substantially cheaper and less complex than other energy storage solutions of similar performance. Additionally, the decrease on space demands (by placing the energy storage module behind the solar panel) may increase the desirability of the modular energy storage devices within the population having large families compared to the size of their homes. Not only can the city improve from increased participation, but an electrical utility can benefit from the real time collection of data and management of a wide network of modular energy storage devices. Regardless of a city's ability to financially incentivize such installations, modular energy storage devices can reduce installations costs by approximately 40% without leveraging decreasing battery prices.

In yet another example use case, a city may wish to improve its emergency preparedness by maintaining a widespread emergency power distribution system. By integrating a plurality of modular energy storage devices, grid-tie connections, and a gateway controller (GWC), existing transmission lines can be used, and power can be routed to priority destinations. Similarly, a GWC can help balance energy demand and energy production, such as selectively storing energy from or releasing energy to the grid.

In another example use case, a self-contained breathing apparatus (SCBA) user may wish to increase the lifespan of the SCBA. The design of a modular energy storage device could be optimized based on the desired performance criteria or environmental factors, such as lifespan, weight, size, heat, or chemical reactivity for use with the SCBA. The passive thermal regulation of a modular energy storage device can then enable the user to safely work in hazardous environments for longer periods of time, which reduces donning/doffing suits and improves their efficiency.

In yet another example use case, a mobile military unit in a hot environment may wish to supply its communication and security systems with energy, without the limitations of constantly being resupplied with fuel. Energy harvesting systems and modular energy storage devices can be installed on the vehicles for storing excess energy during the day and for use to power the communication and security systems during the night.

In another example use case, a space rover or base on a planet may need reliable energy harvesting and charge storage with long lifespans. Traditional power systems may rely on nuclear batteries, but renewable energy harvesting systems can be more feasible if less energy is required to maintain the energy storage systems in a temperature range. A modular energy storage device could be coupled to a rover or base and can be configured to capture and store energy. The design and performance of such devices could be modified to take advantage of different ambient temperature ranges, atmospheric compositions, light/dark cycles ("day"/ "night"), or other factors that might impact thermo-regulation in extra-terrestrial environments.

In still another example use case, a modular energy storage device can serve as a "utility in a box" alternative to costly grid extension. By incorporating revenue grade metering, modular energy storage devices can serve as a platform for utilities to deliver renewable electricity in new developments and remote areas. Design parameters of a modular energy storage device could be modified to accommodate the voltage and frequency of local power requirements in different regions. Modular energy storage devices can be particularly impactful in areas where grid extension is costly and a distributed energy resource will have a decreased return on investment.

Although the present invention has been described with reference to preferred embodiments, workers skilled in the art will recognize that changes may be made in form and detail without departing from the scope of the invention.

What is claimed is:

1. A device comprising:
  one or more vacuum insulated panels defining an enclosure;
  a phase change material (PCM) within the enclosure, the phase change material comprising organic compounds;
  a plurality of charge storage components in thermal contact with the PCM, the plurality of charge storage components including a lithium-ion battery;
  at least one unidirectional heat pipe including a proximal portion extending into the enclosure, a distal portion extending outside of the enclosure, and an intermediate portion between the proximal portion and the distal portion, the intermediate portion including a bend to provide gravity-assisted unidirectional heat flow from the proximal portion to the distal portion; and
  a housing sized to secure the one or more vacuum insulated panels, the PCM, and at least a portion of the unidirectional heat pipe;
  wherein a melting temperature of the PCM is selected based on an operating parameter or ambient temperature profile of one or more of the plurality of charge storage components; and
  wherein the one or more vacuum insulated panels, the PCM, and the at least one unidirectional heat pipe cooperate to provide passive thermal buffering to protect the plurality of charge storage components from overheating.

2. The device of claim 1, wherein the distal portion of the at least one unidirectional heat pipe is elevated relative to the proximal portion.

3. The device of claim 1, wherein:
  when an ambient temperature is above or equal to a temperature threshold, vapor rises within the at least one unidirectional heat pipe from the proximal portion toward the distal portion through the intermediate portion to dissipate heat; and
  when the ambient temperature is below the temperature threshold, the vapor does not rise within the at least one unidirectional heat pipe.

4. The device of claim 3, wherein:
  when the ambient temperature is above or equal to the temperature threshold, the at least one unidirectional heat pipe operates to draw heat away from the PCM; and
  when the ambient temperature is below the temperature threshold, the one or more vacuum insulated panels, the PCM, and the at least one unidirectional heat pipe cooperate to retain heat within the enclosure.

5. The device of claim 4, wherein the one or more vacuum insulated panels, the PCM, and the at least one unidirectional heat pipe to maintain a temperature of the plurality of charge storage components within a selected operating temperature range.

6. The device of claim 4, wherein the one or more vacuum insulated panels, the PCM, and the at least one unidirectional heat pipe to protect the plurality of charge storage components from sub-freezing temperatures.

7. The device of claim 1, further comprising a heat sink including a plurality of heat fins configured to dissipate heat, the heat sink coupled to the distal end of the at least one unidirectional heat pipe.

8. The device of claim 1, further comprising a top plate within the enclosure and including a plurality of channels configured to secure the proximal portion of the at least one unidirectional heat pipe.

9. The device of claim 1, wherein the PCM comprises at least one of an organic material and an inorganic material.

10. The device of claim 1, wherein each of the one or more vacuum insulated panels comprises a thin film material defining an evacuated enclosure and a core material within the evacuated enclosure.

11. The device of claim 10, wherein the core material comprises a ceramic porous structure.

12. The device of claim 1, further comprising an electrical circuit enclosed within the PCM.

13. A device comprising:
an electrical component including an integrated circuit;
a phase change material (PCM) disposed around the electrical component, the PCM comprising organic compounds configured to melt at a pre-determined temperature range;
at least one battery to dissipate heat to the PCM;
a plurality of vacuum insulated panels positioned to define an enclosure sized to receive the PCM and the electrical component, the plurality of vacuum insulated panels configured to provide thermal insulation, fire resistance, and physical structure;
a housing sized to secure the plurality of vacuum insulated panels, the phase change material (PCM), and the electrical component; and
at least one unidirectional heat pipe including:
a proximal portion extending into the enclosure;
a distal portion extending out of the enclosure; and
an intermediate portion between the proximal portion and the distal portion;
wherein the distal portion is elevated relative to the proximal portion;
wherein the PCM, the plurality of vacuum insulated panels, and the at least one unidirectional heat pipe cooperate to provide passive thermal buffering to maintain temperature of the electrical component and the at least one battery to prevent overheating.

14. The device of claim 13, further comprising a heat sink including a plurality of heat fins configured to dissipate heat, the heat sink coupled to the distal end of the at least one unidirectional heat pipe.

15. The device of claim 14, wherein:
when an ambient temperature is above or equal to a temperature threshold, vapor rises within the at least one unidirectional heat pipe from the proximal portion toward the distal portion through the intermediate portion to dissipate heat; and when the ambient temperature is below the temperature threshold, the vapor does not rise within the at least one unidirectional heat pipe.

16. The device of claim 13, further comprising a top plate within the enclosure and including a plurality of channels configured to secure the proximal portion of the at least one unidirectional heat pipe.

17. The device of claim 13, wherein the PCM comprises at least one of an organic material and an inorganic material.

18. The device of claim 13, wherein the vacuum insulated panel includes a thin film material defining an evacuated enclosure and includes a core material within the evacuated enclosure, wherein the core material comprises a porous ceramic structure.

19. A device comprising:
a housing including a base portion and a cover portion defining an enclosure, the base portion including a bottom, a first side, a second side, a third side, and a fourth side, the first, second, and fourth sides having substantially equal heights, the third side having a height that is shorter than the first, second, and fourth sides to provide a space between the base portion and the cover portion on the third side;
a plurality of vacuum insulated panels arranged around an interior periphery of the enclosure;
an electrical component including at least one of an integrated circuit and a lithium-ion battery within the enclosure;
a phase change material (PCM) within the enclosure and around the electrical component, the PCM to melt to dissipate heat generated by the electrical component; and
a unidirectional heat pipe including a proximal portion extending into the enclosure, a distal portion extending through the space and away from the enclosure, and an intermediate portion between the proximal portion and the distal portion and including a physical feature to provide a heat rectifier function;
wherein a melt temperature of the PCM is selected based on an operating parameter or ambient temperature profile of the electrical component; and
wherein the plurality of vacuum insulated panels, the PCM, and the unidirectional heat pipe cooperate to provide passive thermal buffering to maintain temperature of the electrical component to prevent overheating.

20. The device of claim 19, the physical feature causes the distal portion to be elevated relative to the proximal portion.

21. The device of claim 19, wherein:
when an ambient temperature is above or equal to a temperature threshold, vapor rises within the at least one unidirectional heat pipe from the proximal portion toward the distal portion through the intermediate portion to dissipate heat; and
when the ambient temperature is below the temperature threshold, the vapor does not rise within the at least one unidirectional heat pipe.

22. The device of claim 19, wherein the electrical component comprises at least one battery.

* * * * *